Jan. 30, 1962 D. B. PERLIS 3,018,788
FLUID BRANCH SWITCHING SYSTEM
Filed Sept. 29, 1959
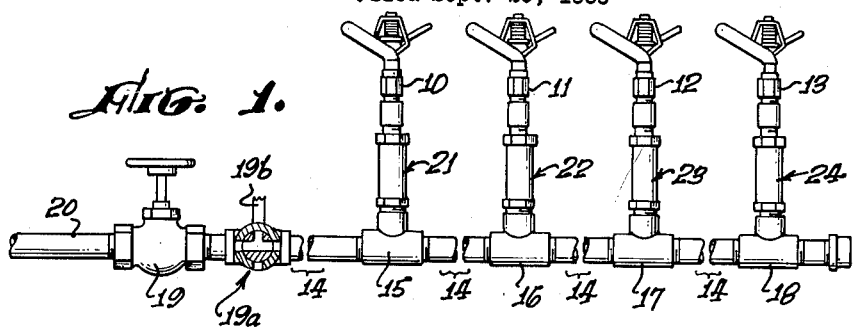
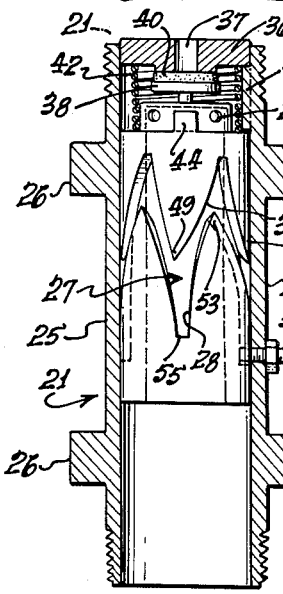
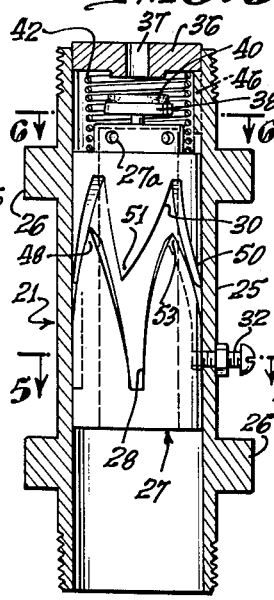
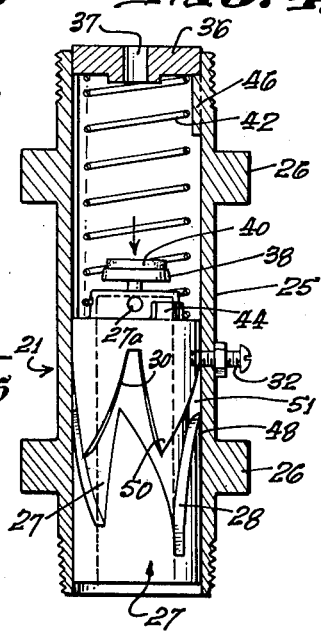
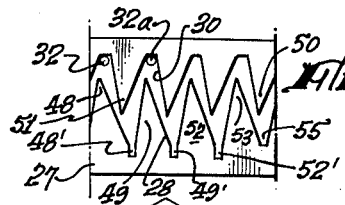
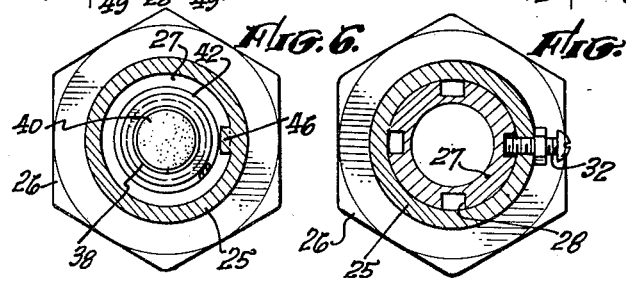
DAVID B. PERLIS,
INVENTOR.
BY
Knight & Rodgers
ATTORNEYS

United States Patent Office 3,018,788
Patented Jan. 30, 1962

3,018,788
FLUID BRANCH SWITCHING SYSTEM
David B. Perlis, 8631 Morehart Ave., Sun Valley, Calif.
Filed Sept. 29, 1959, Ser. No. 843,268
4 Claims. (Cl. 137—331)

This invention relates to a switching system useful in fluid distribution systems having a plurality of branches or outlets, as exemplified by a lawn sprinkler system. The invention is also characterized by a novel hydraulic cycling valve which is responsive to fluid pressure pulses to step through a predetermined sequence of positions, which may include any desired sequence of open, partially open, or closed positions. In the system of this invention, cycling valves are placed in respective branches of a fluid distribution system, with the sequence and initial state of each valve pre-set to provide a desired sequence of fluid flow states in the corresponding branches. The cycling valves are synchronously stepped through their respective sequences by a series of pressure pulses, or interruptions in fluid flow, generated at some convenient point in the fluid distribution system, and transmitted via the fluid therein to each cycling valve.

In fluid distribution systems having a plurality of branches, it is often desirable to switch fluid flow between the branches thereof in a predetermined sequence and from a central control position. For example, lawn sprinkler systems commonly employ a plurality of sprinkler branches fed from a common source, with each sprinkler being placed to water a different area of the lawn. In this system it is often inconvenient or impossible to operate all sprinklers simultaneously, because the resulting load may lower the water pressure at the sprinklers below the level required to operate the sprinklers. In the case of rotary sprinklers, a lowering of pressure may cause stoppage of rotary movement and result in watering of only one sector or a small area in the arc of the sprinkler. With non-rotary sprinklers, a lowering of pressure shortens the radius of watering, and limits watering to the immediate neighborhood of each sprinkler, leaving dry areas in between. Therefore, it is often necessary to operate the sprinklers in sequence, either singly or in groups supplied from a common branch line, in order to adequately water the entire lawn. For uniform watering of the lawn, the sequence may be controlled to operate each sprinkler, or group of sprinklers, once during each complete lawn watering cycle. If lawn conditions dictate that some areas of the lawn receive more water than others, the corresponding sprinklers or groups may operate more than once in each watering cycle.

In the past, sequential operation of the branches in a sprinkler system has been achieved either through manual operation of a valve in each branch thereof, or through remotely controlled valves in each branch thereof. In a typical installation having manual valves, branch flow was switched by closing the main valve, walking to each branch valve which required opening or closing, adjusting the branch valves to the desired state of fluid flow, returning to the main valve, and re-opening the main valve. With remotely controlled valves, the branch switching could be performed automatically at a central control point, but requires a relatively costly remote control system, which usually included solenoid or water pressure operated valves in each branch with complex control mechanism at a central control panel.

Accordingly, one object of this invention is to provide a fluid branch switching system for a fluid distribution system wherein fluid flow in branches thereof may be switched through a predetermined sequence of states of flow by a series of fluid pressure pulses generated in the fluid distribution system at some point common to all the branches thereof.

Another object of this invention is to provide a hydraulic cycling valve switchable through successive, predetermined, fluid flow states or positions in response to fluid pressure pulses applied via the fluid controlled thereby.

A specific object of this invention is to provide a lawn sprinkler system having a plurality of sprinkler outlets which can be switched through a predetermined sequence of open and closed states by a series of temporary interruptions in flow at the water source thereof.

In accordance with this invention, however, a simple, inexpensive, and dependable hydraulic cycling valve has been devised which permits remote sequential control of branch flow via fluid in the distribution system, without requiring an independent remote control system for the branch valves. The cycling valve of this invention can be preset to any desired sequence of fluid flow states, and the state of each branch cycling valve in the branches of the system can be changed by simply closing and reopening the main valve of the system, or by generating a pressure pulse which is transmitted via of the fluid in the system to each branch cycling valve thereof. Thus, with this invention the advantages of a remotely controlled branch switching system are gained without a separate and costly remote control system as heretofore employed in the art.

For our purposes here, a pressure pulse is a rise and fall in fluid pressure, not necessarily dropping to zero pressure but passing through a predetermined range. The rise or fall may occur first in a cycle depending on the starting point assumed for a cycle.

How the above objects and advantages of this invention are attained will be apparent to those skilled in the art from the following description of one illustrative embodiment thereof, in connection with the annexed drawing, in which:

FIG. 1 is a diagrammatic representation of a lawn sprinkler system utilizing the fluid branch switching system of this invention.

FIG. 2 is a median longitudinal section of an embodiment of the hydraulic cycling valve of this invention shown in a closed position.

FIG. 3 is a median section of the valve of FIG. 2 shown in an open position during fluid flow.

FIG. 4 is a median section of the valve of FIG. 2 shown in a rest or initial position, as when fluid flow is stopped.

FIG. 5 is a transverse section taken on the line 5—5 of FIG. 3.

FIG. 6 is a transverse section taken on the line 6—6 of FIG. 3.

FIG. 7 is a developed view of the sequence-determining cam of the valve disclosed in FIGS. 2 through 6.

FIG. 8 is a developed view of another sequence-determining cam which can be employed in the place of the cam shown in FIG. 7 to provide a different sequence of operations for the valve disclosed in FIGS. 2 through 6.

FIG. 1 shows a lawn watering system comprising a plurality of rotary type sprinklers 10–13, common supply line 14, branch junctions 15–18, each supplying a separate branch including one sprinkler 10–13, main valve 19, and main conduit 20 which is coupled to any suitable water source, not shown. The lawn watering system is adapted for branch switching in accordance with this invention by means of cycling valves 21–24, which are placed one in each of the respective branches of the sprinkler system between the corresponding sprinkler and branch T fitting. The cycling valves, which are responsive to temporary interruptions of flow in feeder line 14, may be operated by manually closing and re-opening the main valve 19, which may be of any suitable type; but when this operation is time consuming, a two-way valve 19a is coupled in supply line 14 merely for greater speed and convenience in manually switching the cycling valves. With two way valve 19a, which is shown as a rotary plug type of valve, water flow in feeder line 14 can be quickly shut off by rotating valve handle 19b ninety degrees clockwise, as indicated by the arrow in FIG. 1, and quickly re-established by returning valve handle to the position shown. This valve has the further advantage that when in the second or off position it can drain water out of line 14, for reasons that will be explained.

Cycling valves 21–24 may be preset to provide any desired sequence of operation for sprinklers 10–13, but as an example it will be assumed that each cycling valve has a four step sequence of positions, which is continuously repeated, consisting of three consecutive closed positions followed by an open position. In this case, the initial state of each valve would preferably be set such that only one valve would be open at any step of the four step sequence. This can be done, for example, by initially setting all valves 21–24 so that in their first positions, valve 21 is in its open state, valve 22 is in its third closed state, valve 23 is in its second closed state, and valve 24 is in its first closed state. Under these initial conditions or positions, each temporary interruption of water flow in line 14 acts to transfer the open state in succession from left to right in the sprinklers 21 to 24, shown in FIG. 1, with the open state beginning with the branch containing sprinkler 10 and returning to sprinkler 10 after each cycle of four flow interruptions or pressure pulses.

The construction of each of the cycling valves 21–24 is disclosed in FIGS. 2 through 6. FIGS. 2, 3 and 4, respectively show cycling valve 21 in its closed, open and initial states. Referring first to FIG. 4, which shows the initial or rest position, cycling valve 21 comprises a hollow, fluid conducting body member 25 having an inlet end at the bottom of the drawing and an outlet end at the top of the drawing, with the inlet and outlet ends being threaded externally to receive pipe couplings or similar fittings. Hexagonal shoulders 26 are provided near the threads of body member 25 to receive a wrench to facilitate coupling into a water line.

Slidably mounted within body member 25 is a piston or hydraulic plunger 27. Piston 27 is movable both axially and rotationally within body member 25, and has formed in the outer surface thereof two opposing sawtooth cam surfaces 28 and 30, which define a zig-zag channel extending around the periphery of piston 27. A cam follower pin 32, which is rigidly attached to body member 25, rides in the zig-zag channel as shown and engages cam surfaces 28 and 30.

Piston 27 is preferably hollow, to permit flow of water therethrough. In the instant embodiment, the lower or inlet end of piston 27 is open and the outlet end is effectively open to water flow through holes 27a cut therein. However, the hollow, open-ended construction is not essential to the invention, since piston 27 can be a solid body if enough clearance is provided between it and body 25 to allow adequate water flow between the piston and body member 25.

Piston 27 is biased toward the inlet end of body member 25 and the position of FIG. 4. The biasing agent may be gravity or an expansion spring 42, or both. The spring bears against plug 36 rigidly affixed to the outlet end of body 25. An outlet opening 37 is cut into endpiece 36, and the surface of plug 36 is raised around the inner end of opening 37 to form a seat engaged by valve member 38, which is faced with a pad of resilient material 40. Valve member 38 is attached to the outlet end of piston 27.

Generally described, the sequential switching action of valve 21 is derived from axial movement of piston 27 in response to pressure pulses, i.e. pressure increases separated by transitory pressure drops, in the water pressure applied to the inlet end of the valve. The axial motions of piston 27 produce rotation thereof in predetermined angular increments by the interaction between cam follower pin 32 and sawtooth cam surfaces 28 and 30. The number and spacing of the angular increments can be preset to any desired magnitude and sequence by appropriate design of the cam means, but in this specific embodiment four increments of 90 degrees each are employed. In three rotational positions of piston 27, water pressure transmitted therethrough seats valve member 38 against end plug 36 and closes outlet opening 37, as shown in FIG. 2. In the remaining one rotational position of piston 27, axial movement thereof is limited by a lug 44 on piston 27 engaging an abutment 46 on body 25, as shown in FIG. 3, whereby valve 38 is prevented from seating against end plug 36, thereby allowing water to flow through outlet opening 37.

It should be noted at this point that the lug-abutment means for limiting the axial travel of piston 27 is optional, since movement limiting means can also be provided by the cam and follower means, as later to be described, for holding the valve open in the desired rotational position of piston 27. But lug 44 and abutment 46 are preferably employed in this embodiment instead of the cam movement-limiting means in order to reduce wear on cam follower pin 32. Pin 32 in this embodiment is screw-threaded through body member 22 and must be removed to dismantle the valve for repairs. In general, however, only one movement-limiting means will be required in the invention.

The sequential switching action of valve 21 can be more clearly described in connection with FIG. 7, which shows a developed view of piston 27 along with the relation of pin 32 thereto in the initial state illustrated in FIG. 4. In the absence of water pressure at the inlet end of the valve, spring 42 and/or gravity force piston 27 toward the inlet end thereof, with the downward axial travel of piston 27 being limited by the engagement of pin 32 in a notch of upper cam surface 30. In the rest or initial position illustrated in FIGS. 4 and 7, pin 32 seats in the valley between teeth 50 and 51 of cam surface 30. This position precedes the first closed position in the sequence of three closed positions, since the initial application of water pressure now moves piston 27 to the first closed position shown in FIG. 2.

When water enters the valve 21, pressure is applied by the water to the inlet end of piston 27 which is driven upwardly toward the outlet end of the valve, and pin 32 engages the right hand sloping surface of tooth 48, thereby rotating piston 27 through 45 degrees as it rises toward the outlet. The notch 48' to the right of tooth 48 in FIG. 7 is relatively deep to allow full axial travel of piston 27. Lug 44 is misaligned from abutment 46, and therefore the initial application of water pressure seats valve member 38 against plug 36 to close the valve to water flow, as shown in FIG. 2. The valve member remains in this position as long as the water pressure continues to be applied to the piston and is sufficient to raise the piston and compress spring 42.

When water pressure is reduced by shutting either valve 19 or 19a, piston 27 moves down to the initial position shown in FIG. 4, being rotated 45 degrees, more or less, during each axial movement for a total of 90 degrees rotation in the complete axial oscillation produced by a pressure pulse.

Piston 27 will drop by gravity alone if made of metal and so is heavy enough to displace water beneath it, which flows up through holes 27a. However, it may be preferred to employ spring 42 to assist in returning the piston to the rest position of FIG. 4 in a more rapid and positive manner than gravity alone can do. Also, the valve can be used in a horizontal or other position in which a gravity biased piston would not return to the rest position, when spring 42 is employed.

As the piston drops down, pin 32 engages the sloping right-hand side of tooth 51 to rotate the piston 45 degrees as the pin moves to the position 32a in FIG. 7. Proper engagement by the pin of the successive cam surfaces is assured by virtue of the angular off-set relation between the points and valleys of opposing sawtooth cam surfaces 28 and 30. When water pressure is now restored by open valves 19 and 19a, piston 27 moves up and pin 32 engages the right-hand sloping side of tooth 49. This places valve 21 in its second closed position with pin 32 in the second notch 49' from the left in lower cam surface 28 of FIG. 7.

The next pressure pulse consisting of a reduction and restoration of fluid pressure rotates piston 27 an additional 90 degrees to its third closed position, with pin 32 in the third notch 52' from the left in FIG. 7. On the next oscillation of piston 27 pin 32 seats in short notch 55, which is shorter or shallower than the others. Engagement of pin 32 in notch 55 may be used to limit the axial movement of the piston toward the outlet and hold the valve open as shown in FIG. 3; but in this embodiment lug 44 and abutment 46 are preferably employed for this purpose to reduce wear on pin 32, which must be removed to repair the valve. As shown in FIGS. 2 and 3, abutment 46 is preferably aligned above pin 32 and lug 44 above short notch 55, so that lug 44 will engage abutment 46 when pin 32 enters short notch 55. When the valve is in its open position, the next pressure pulse returns it to its first closed position, and the cycle described above is repeated for successive pressure pulses.

With a four-step valve as illustrated, each step is designed to rotate the valve 90 degrees, but the invention is not necessarily so limited. Generally speaking each pulse or step will rotate the piston an equal fraction of a complete revolution and be equal to 360 degrees divided by the number of steps. Also the angular movement during each of the two strokes of an oscillation has been assumed to be equal, but it may be desired to rotate the piston through a greater angle as it moves up under the force of water pressure than during the return or down stroke.

The cycling valve of this invention can be adapted to any desired sequence of states by appropriate design of the piston cam surfaces and movement limiting means thereof. FIG. 8 shows a suitable arrangement of cam surfaces 28a and 30a to provide a six step sequence containing two open positions each spaced from the other by two closed positions, corresponding respectively to the arrangement of short notches 61 and long notches 62 on the lower cam surface in FIG. 8. It will be understood that with this second cam surface arrangement the valve body 25 would be fitted with an additional movement-limiting abutment at a position diametrically opposing abutment 46, since the valve would be open twice during each complete rotation of the piston. When open, pin 32 would be engaged in one of the two short notches 61 of the lower cam surface 28a of FIG. 8, and lug 44 would be engaged by a corresponding abutment, in the same manner as described in connection with the cam surfaces of FIG. 7. In the design of alternately inclined cam surfaces it should be noted that the points and notches of the two opposing cam surfaces are angularly offset from each other to insure that the follower pin engages the inclined surfaces to give the desired sequential stepping action. The sequential order of open and closed states may be set by the sequence of long and short notches on the lower cam surface, or alternately by the position of abutments on the body relative to a lug on the piston.

The total number of notches 61 and 62 determines the number of steps in a sequence, and may be varied over a wide range. Valves with twenty or more steps have been designed.

Valves 22, 23 and 24 are duplicates of valve 21 described above, and, as mentioned before, the initial position of each valve relative to the other valves is preferably set to a different step of the common four step sequence such that only one of the four valves will be open at any given time. The initial state of the valves can be set in various ways. One way is to set the position of piston 27 before the valve is attached to line 14, as at one of the T's 15–18. Before installation the position of the valve can be determined by inspection and changed by shaking the valve endwise. In this way each valve can be set to any desired step in the sequence by moving piston 27 to simulate application and release of water pressure. After lug 44 strikes abutment 46 and the piston is returned to a rest position the valve is set to move to the first closed position, since the initial application of water pressure after installation will move it from the rest position shown in FIG. 4 to the position shown in FIG. 2. Each succeeding shake of the valve endwise advances it one position in its four step sequence of three closed positions followed by one open position.

The valves can also be set to any desired position after installation. One typical way of doing this is to screw in bolt 32 far enough to lock in position the piston on all valves but one. That one can be then brought to any desired position by opening and shutting valve 19a. The piston of another valve is then released by backing off bolt 32 and it individually is brought to the desired position while the first valve is held in position by its bolt 32. This is repeated for each valve separately, and finally all pistons are released.

When the initial position of each valve 21–24 in the four valve system is set to a different position of the four-step sequence, as described above, they will remain in different positions relative to each other, since each valve is stepped through the same four-step sequence in response to pressure pulses generated at the two way valve 19 or 19a. Therefore sprinklers 10–13 will operate one at a time, with the open sprinkler being turned off and one closed sprinkler being turned on for each temporary interruption of water flow in feeder line 14 caused by closing and opening valve 19a.

Another way of setting the valves is to stop all of the pistons in the same position, as by an index pin. By removing the pins in a pre-established pattern the valves are freed after known numbers of pulses and then start moving through the same step-sequence characterizing all valves.

Valve 19a is used primarily when it is desired to have a quick-operating manual valve, since the screw threaded stem of a valve as at 19 closes and opens relatively slowly. Of course other types of valves may be used within the scope of the invention. However, valve 19a is the type that allows water in line 14 to drain out through the valve when handle 19b is horizontal. This feature may be found advantageous when the valve is lower than cycling valves 21–24 as the back-flow of water in the lines facilitates movement of the pistons 27 from the raised position of FIG. 2 to the lowered position of FIG. 4, and may eliminate the need for spring 42.

From the foregoing description it will be apparent that this invention provides a novel hydraulic cycling valve switchable through a predetermined sequence of states in response to pressure pulses applied via the fluid controlled thereby. It will also be apparent that this invention provides a novel fluid branch switching system wherein fluid flow in branches of a fluid distribution system can be switched through a predetermined sequence by means of pressure pulses conducted through the fluid of the system. It should be understood that this invention is not limited to the specific structures disclosed herein, since modifications can be made in the structure disclosed without departing from the basic teaching of this invention. For example, valve 21 is shown to have only an "open" and a "closed" state, but it may be adapted for "intermediate flow" states by shortening abutment 46 to partially constrict fluid flow through opening 37. Many other sequences can be provided in place of the two examples disclosed, and a tapered outlet opening and tapered valve plunger may be employed in place of flat end piece 36 and valve member 38 as shown. Various parts may be reversed. Thus the cam surfaces may be in the stationary body and the follower pin on the moving piston. Other variations in the cam surfaces may be made within the scope of my invention.

These and many other modifications will be apparent to those skilled in the art, and this invention includes all modifications falling within the scope of the following claims.

I claim:
1. A cycling valve for controlling fluid flow comprising, in combination:
a hollow body with a fluid inlet and a fluid outlet at opposite ends thereof; a valve means within the body movable toward and away from the fluid outlet for controlling fluid flow therethrough;
a piston member coupled to the valve means, the piston member being movable axially within the body in response to fluid pressure thereon between a first position in which the valve means is spaced from the fluid outlet and a second position in which the valve means covers and closes the fluid outlet;
cam and follower means rotating the piston member during said axial movement to successive ones of a plurality of rotational positions; and abutment means limiting axial travel of the piston member in at least one of the last mentioned rotational positions to stop the piston member and valve means short of the second position closing the fluid outlet.

2. The combination defined in claim 1 that also includes means biasing the piston toward said first position thereof, and wherein said piston is responsive to a fluid pressure pulse applied to the inlet of the body to move in opposition to the biasing means and to oscillate once between the first and second axial positions thereof.

3. The combination defined in claim 1 wherein the piston is hollow and is provided with openings in the ends thereof to permit fluid flow therethrough, and wherein the valve means comprises a plunger attached to the outlet end of the piston and said fluid outlet is an opening formed in the outlet end of the body, the fluid outlet being concentric with and axially opposing the plunger, and said second position closing the valve being defined by engagement of the plunger against the fluid outlet.

4. The combination defined in claim 1 and also including a lug projecting axially from the outlet end of the piston and an abutment projecting radially inwardly of the body near the outlet end of the body, the lug being adapted to engage the abutment when the piston is in the rotational position established as the open position of the valve, to limit axial movement of the piston to prevent the piston from reaching the second position closing the valve.

References Cited in the file of this patent
UNITED STATES PATENTS

| | | |
|---|---|---|
| 2,666,450 | Berry | Jan. 19, 1954 |
| 2,793,908 | Carver | May 28, 1957 |